Dec. 27, 1960 V. A. VDOLEK 2,965,928
MECHANICAL LAST EXCHANGERS
Filed Oct. 17, 1957 2 Sheets-Sheet 1

Inventor
V. A. Vdolek
By Glascock Downing Seebold
Attys.

Dec. 27, 1960　　　　V. A. VDOLEK　　　　2,965,928
MECHANICAL LAST EXCHANGERS
Filed Oct. 17, 1957　　　　　　　　　　　　2 Sheets-Sheet 2

Inventor
V. A. Vdolek
By Glascock Downing Seebold
Attys.

United States Patent Office 2,965,928
Patented Dec. 27, 1960

2,965,928

MECHANICAL LAST EXCHANGERS

Vladimir A. Vdolek, Batawa, Ontario, Canada, assignor to The Bata Shoe Company of Canada Limited, Batawa, Ontario, Canada Filed Oct. 17, 1957, Ser. No. 690,846

Claims priority, application Canada Oct. 19, 1956

6 Claims. (Cl. 18—17)

The present invention relates to molding machines, particularly of the type that mold hollow articles of rubber and plastic material, and to combination molding and vulcanizing machines.

In particular, the present invention relates to the automatic exchange of lasts in molding machines such as disclosed in my copending United States patent application Serial No. 591,724 filed June 15, 1956, for "Shoe Molding Machines" (which corresponds to my Canadian priority patent application No. 694,553, filed October 13, 1955, for "Molding Machines" and assigned to Bata Shoe Company of Canada Limited, since issued as Canadian Letters Patent No. 568,981 on January 13, 1959. This application is a continuation-in-part of my aforesaid copending United States application Serial No. 591,724 (which was issued on October 6, 1959, as United States Letters Patent No. 2,907,068).

In the past, the operation of machines of this nature required the operator to move the lasted shoes manually into molding position. Moreover, after the molding had been completed it was necessary to pull the lasts by hand from molding position to an accessible position on the work table of the machine, in order to peel the molded shoe from the lasts. These operations were time-consuming, and in addition were very tiring for the operator. Such disadvantages are completely overcome by the present invention which utilises a plurality of reciprocable last carriers to move the lasts mechanically into and out of the molds.

In the accompanying drawings.

Figure 1:
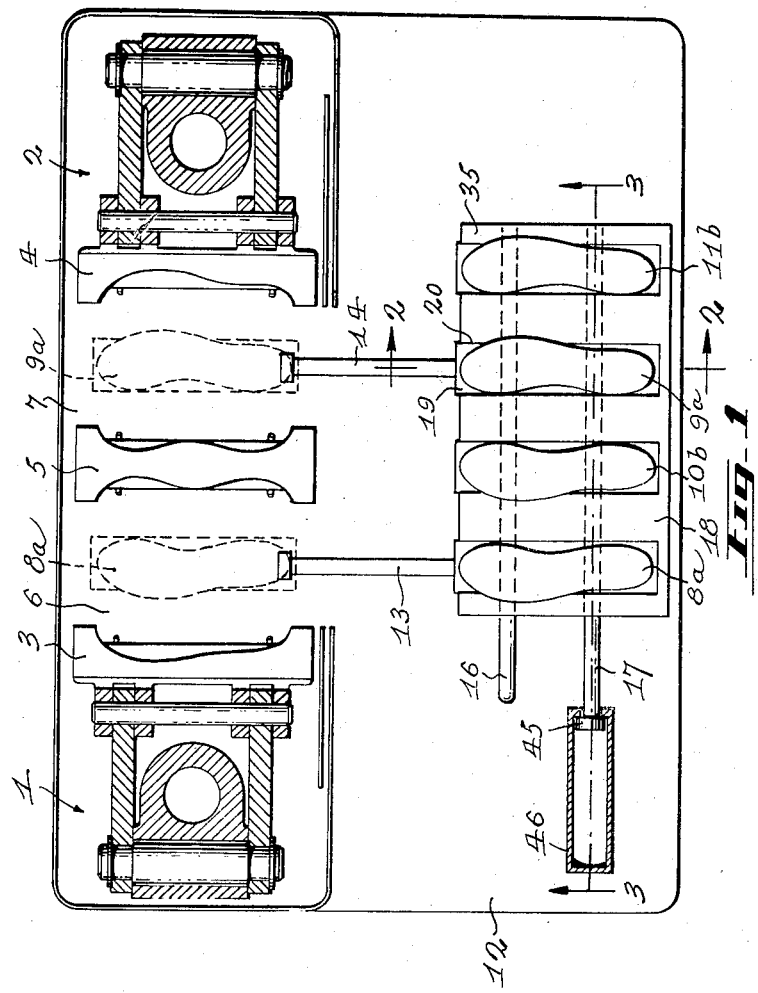
Fig. 1 is a top view of the machine with the top portion of the molding machine cut away.

Referring now in detail to the drawings, in Fig. 1 the drive mechanisms of my molding machine as disclosed in my aforesaid United States patent application Serial No. 591,724 (and said corresponding priority Canadian patent application No. 694,553) are indicated generally at 1 and 2. Side molds 3 and 4 are located one on either side of center mold 5, forming enlarged molding cavities 6 and 7 to accommodate the entry of the lasted shoes.

Two pairs of lasts 8a, 9a and 10b, 11b are situated on work table 12, and as shown in Fig. 1, lasts 8a and 9a are directly opposite enlarged molding cavities 6 and 7 respectively. The lasts 8a and 9a are shown in dotted lines in molding position in the enlarged molding cavities 6 and 7. Also shown in Fig. 1 are the longitudinal tracks 13 and 14 provided for the movement of the lasts forwardly into and rearwardly out of the adjacent molds 6 and 7, last 8a being shown on track 13 and last 9a on track 14. Transverse tracks 16 and 17 and last carrier 18 are utilized in movement of the lasts 8a, 9a, 10b and 11b from side to side.

Figure 2:
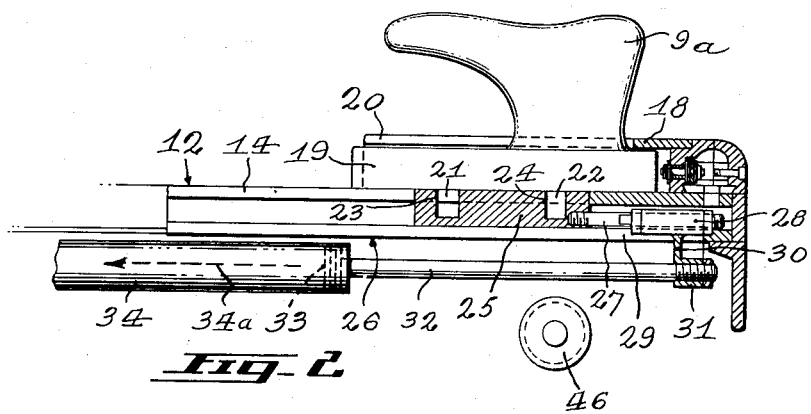
Fig. 2 is a sectional view along lines 2—2 of Fig. 1.

Referring now to Fig. 2, the last 9a, attached to a last support or base 19, rests on work table 12, the base 19 being located in last carrier 18 an open channel 20 in transverse and the last 9a projecting upwardly through channel 20 in last carrier 18. Projecting downwardly from the bottom of base 19 are lugs 21 and 22 adapted to fit slots 23 and 24 respectively in lug-engaging block 25. The lug-engaging block 25 rests on guide 26 and projects upwardly through track 14 in work table 12 so that the upper surface of last-carrying block 25 is flush with the upper surface of the work table 12. One end of a connecting pin 27 is fixedly attached to that end of lug-engaging block 25 nearest slot 24. Fixedly connected to the other end of pin 27 is collar 28, the lower portion of which projects downwardly through track 29 in guide 26. Collar 28 is provided with a downwardly projecting arm 30 terminating at its lower end in collar 31. Collar 31 is fixedly attached to the end of piston rod 32, the piston rod 32 terminating at its opposite end in piston 33 in cylinder 34. (See also Fig. 3.)

The action of the piston 33 in the direction of arrow 34a will actuate piston rod 32, collar 31, arm 30, collar 28, connecting rod 27, and lug-engaging block 25, all in the direction of the arrow 34a. As the lug-engaging block 25 begins to move in this direction it acts against lugs 21 and 22 of the last base 19, moving the base 19 and hence the last 9a forwardly and out of the lateral last carrier 18, the last 9a moving along and finally out of channel 20. Travel in this direction is continued until the last 9a reaches the position shown in dotted lines in Fig. 1. A similar last carrying arrangement is provided at molding cavity 6, so that in the machine position illustrated in Fig. 1, last 8a can be transported from the position shown in solid lines to the position shown in dotted lines simultaneously with last 9a.

Figure 3:
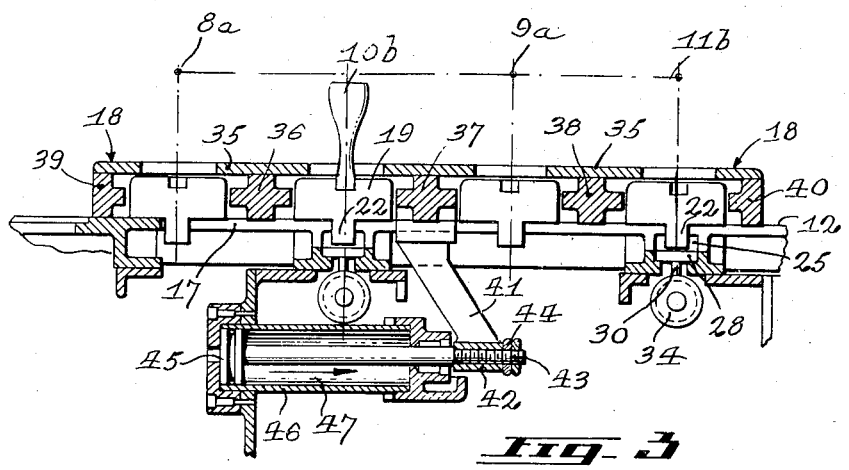
Fig. 3 is a sectional view along line 3—3 of Fig. 1.

Turning now to Fig. 3, it will be seen that the transverse last carrier 18 is composed of a top plate 35, three cross-shaped abuttal members 36, 37 and 38 and two T-shaped end abuttal members 39 and 40, all being integral parts of the last carrier 18. The two sets of lasts 8a, 9a, and 10b, 11b, are positioned on their respective bases. Taking last 10b as an example, the base 19 is positioned in the transverse last carrier 18, rests on work table 12, and is abutted on one side by member 36 and on the other side by member 37. The lug 22 projects downwardly from base 19 and is free to move from side to side in track 17 in work table 12. The corresponding forward lug 21 (which cannot be seen in Fig. 3 but is visible in Fig. 2) is also free to move from side to side in track 16 in work table 12. Fixedly attached to the bottom of abuttal member 37 is a drive arm 41 projecting downwardly through track 17 in work table 12 and terminating at its lower end in collar 42. Piston rod 43 is bolted at one end to collar 42 by nuts 44 and the piston rod 43 terminates at its other end in piston 45 located in cylinder 46.

The action of the piston 45 in the direction of the arrow 47 will actuate piston rod 43, collar 42, drive arm 41 and abuttal member 37, all in a similar direction. As member 37 is an integral portion of last carrier 18, the entire carrier 18 will also move in the direction of arrow 47, carrying with it the four lasts 8a, 9a and 10b, 11b. As this travel is executed, the last-carrier 18 and the four lasts slide on work table 12 while the top portion of the drive arm 41 rides in track 17 of work table 12, and the two lugs (21 and 22) on the bottom of each of the four lasts slide in tracks 16 and 17 respectively, in the work table 12.

When the piston 45 has travelled in the direction of arrow 47 for the entire length of cylinder 46 the last carrier 18 and the four lasts will have reached a position in relation to the molding cavities corresponding to that illustrated in Fig. 1. (It should be understood that the cylinder 46 as illustrated in Fig. 1 is shown beside rather than underneath the last carirer 18 for purposes of clarity. The relative position of the cylinder 46 is, of course, unimportant. The same holds true for cylinder 34 when Fig. 1 is compared with Fig. 2.)

The entire distance travelled in either direction by the lateral last carrier 18 is such that when the travel is completed, either last 8a and 9a or lasts 10b and 11b will be located in line with longitudinal tracks 13 and 14 respectively.

The operation of the machine is as follows: The normal starting position of the machine is illustrated in Fig. 1. The operator places the unvulcanized components of the shoes to be molded on last 8a and 9a and presses the starter button (not shown). Lasts 8a and 9a are carried along longitudinal tracks 13 and 14 respectively, last 9a being carried by the action of piston 33 as already explained, and last 8a being carried by the action of a piston (not shown) corresponding to piston 33. When the lasts 8a and 9a have reached the position shown in dotted lines in Fig. 1, the molds automatically close and the vulcanization process is begun. When vulcanization is complete, the molds automatically open, and the lasts 8a and 9a are returned along tracks 13 and 14 to the position shown in solid lines in Fig. 1.

During this time the operator has placed unvulcanized shoes on lasts 10b and 11b. The piston 46 now acts to move the transverse last carrier 18 so that lasts 10b and 11b occupy the position held by lasts 8a and 9a in Fig. 1. Lasts 10b and 11b are now in position to be carried into the molds for vulcanization. During the period that lasts 10b and 11b are being carried into the molds, vulcanized, and returned to the lateral last carrier 18, the operator is free to remove the vulcanized shoes from last 8a and 9a, and place the unvulcanized components of the next shoes to be molded thereon.

The action of the last carriers is such that two of the lasts (either 8a and 9a or 10b and 11b) are carried forwardly into and rearwardly out of the molds, following which all of the lasts are moved transversely from one side to the other. Between each complete forward and rearward movement of the lasts there is a single transverse movement. This action may be continuously and automatically cycled so that it continues throughout the normal work period, or the action may be stopped and started by the operator at will.

When the automatic action of the lasts and the molding machine is continuous it is so cycled that one trained worker can operate two machines.

The embodiments of the invention in which an exclusive property or privilege is claimed are defined as follows:

1. Apparatus for mechanically transporting lasts into and out of adjacently situated moulding cavities comprising in combination, a plurality of moulding cavities, a work table extending into said moulding cavities and forwardly thereof, a slotted longitudinal track extending from within each of said moulding cavities forwardly to near the edge of said work table, a slotted longitudinal guide under each of said longitudinal tracks and extending the full length thereof, at least one transverse slotted track on said work table perpendicularly intersecting said longitudinal slotted tracks, two lasts for each of said moulding cavities, each of said lasts riding on a support block, each of said support blocks slidably resting on said work table and having downwardly-projecting lugs engageable in said slotted tracks and terminating short of said slotted longitudinal guide table, a transverse last carrier slidably resting on said work table and positioned generally in front of said moulding cavities, said transverse last carrier having a channel for each of said last support blocks opening toward said moulding cavities and being large enough to slidably receive one of said last support blocks, a lateral drive arm projecting upwardly through said transverse slotted track being fixedly connected at its upper end to said transverse last carrier, transverse reciprocal drive means connected to the lower end of said lateral drive arm, a longitudinal drive arm projecting upwardly through each slot in said longitudinal guide table and terminating in a lug-engaging block slidably resting on said guide table, each of said lug-engaging blocks projecting upwardly through one of said slotted tracks in said work table, the upper surface of said lug-engaging blocks being flush with the surface of said work table, slots in the upper surface of said lug-engaging blocks being open laterally therein, and longitudinal reciprocal drive means connected to the lower end of said longitudinal drive arm.

2. Apparatus for mechanically transporting lasts into and out of adjacently situated molding cavities comprising in combination, a plurality of mold cavities, a work table extending into said molding cavities and forwardly thereof, longitudinal guide means extending from within said molding cavities forwardly to near the edge of said work table, transverse guide means on said work table perpendicularly intersecting said longitudinal guide means, two lasts for each of said molding cavities, each of said lasts riding on a support block, said support blocks slidably positioned in a transverse last carrier, said transverse last carrier resting on said work table and positioned in front of said molding cavities, said transverse last carrier having channels for said last support blocks opening toward said molding cavities and being large enough to slidably receive one of said last support blocks, transverse reciprocal drive means connected to at least one lateral drive arm to move said last support blocks along said transverse guide means and longitudinal reciprocal drive means connected to said last support blocks to move said last support blocks along said longitudinal guide means into and out of said molding cavities.

3. An apparatus for mechanically transporting a pair of lasts to and from at least one pair of adjacently situated molding cavities of a molding machine, comprising: a work table extending from a molding station adapted to support the molding cavities forwardly thereof to a loading station; longitudinal guide means extending from said molding station forwardly to near the edge of said work table loading station, transverse guide means on said work table perpendicularly intersecting said longitudinal guide means; two pairs of lasts for each pair of the molding cavities at said molding station, each of said lasts riding on a support, said supports slidably positioned in a transverse last carrier, said transverse last carrier resting on said work table in said loading area and positioned in front of said molding station, said transverse last carrier having channels for said last supports opening toward said molding station and being large enough to slidably receive one of said last supports, transverse reciprocal drive means including at least one lateral drive arm to move said last supports along said transverse guide means, and longitudinal reciprocal drive means connected to said last supports to move a pair of said last supports along said longitudinal guide means from said loading area to said molding station and returning said support blocks to said loading area.

4. Apparatus for mechanically transporting lasts into and out of at least one pair of adjacently situated molding cavities on a molding machine, comprising: a work table extending from a molding station adapted to support said molding cavities forwardly thereof to a loading station, a slotted longitudinal track extending from where each of said molding cavities is located at said molding station forwardly to near the edge of said work table at said loading station, a slotted longitudinal guide table under each of said longitudinal tracks and extending the full length thereof, at least one transverse slotted track on said work table perpendicularly intersecting said longitudinal slotted tracks, two lasts for each of the pair of molding cavities at the molding station, each of said lasts riding on a support block, each of said support blocks slidably resting on said work table and having downwardly-projecting lugs engageable in said slotted tracks and terminating short of said slotted longitudinal guide table, a transverse last carrier slidably resting on said work table and positioned generally in front of said molding station, said transverse last carrier having a channel for each of said last support blocks opening toward said molding cavities and being large enough to slidably receive one of said last support blocks, a lateral drive arm projecting through said transverse slotted track being fixedly connected at its upper end to said transverse last carrier, transverse reciprocal drive means connected to the lower end of said lateral drive arm, a longitudinal drive arm projecting upwardly through each slot in said longitudinal guide table and terminating in a lug-engaging block slidably resting on said guide table, each of said lug-engaging blocks projecting upwardly through one of said slotted tracks in said work table, the upper surface of said lug-engaging blocks being flush with the surface of said work table, slots in the upper surface of said lug-engaging blocks being open laterally therein, and longitudinal reciprocal drive means connected to the lower end of said longitudinal drive arm.

5. A shoe last exchanger apparatus for mechanically transporting two pairs of shoe lasts to and from at least one pair of adjacently situated molds of a shoe molding machine, comprising: a work table extending from a molding station adapted to support the pair of molds and forwardly thereof, providing a loading station; two pairs of supports, each adapted to support a shoe last so that there are two pairs of lasts for the pair of molds at said molding station, said last supports being positioned opposite said molding station when at the loading station; first reciprocable power actuated means for translating said last supports transversely of said work table at said loading station, in a direction substantially perpendicular to the axis of said last supports which extends longitudinally toward the molding station, to move a first pair of said last supports into operational alignment with said molding station while moving the second pair of last supports out of operational alignment with said molding station; second power actuated reciprocable translating means for moving said first pair of last supports longitudinally to said molding station for molding operation, and for returning said first pair of last supports to the loading station; said first power actuated translating means being operable after the return of said first pair of last supports to the loading station to transversely translate said last supports and move said second pair of last supports into operational alignment with said molding station while moving said first pair of last supports out of operational alignment with said molding station, and said second power actuating translating means thereafter being operable to move said second pair of last supports longitudinally to the molding station for molding operation and to return said second pair of last supports to the loading station.

6. A shoe last exchanger as defined in claim 5, further comprising: two pairs of lasts mounted on said last supports, said lasts being arranged with two left lasts and two right lasts next to each other.

References Cited in the file of this patent
UNITED STATES PATENTS

| 845,714 | Mayo | Feb. 26, 1907 |
| 2,525,609 | Lewis | Oct. 10, 1950 |
| 2,757,414 | Chaloupka | Aug. 7, 1956 |

FOREIGN PATENTS

| 714,932 | Great Britain | Sept. 8, 1954 |